United States Patent [19]
Higley et al.

[11] Patent Number: 5,913,025
[45] Date of Patent: Jun. 15, 1999

[54] METHOD AND APPARATUS FOR PROXY AUTHENTICATION

[75] Inventors: DeeAnne Barker Higley, Provo; Bruce Warner Thorne, Salem; Brian Lee Jarvis, Orem, all of Utah

[73] Assignee: Novell, Inc., Orem, Utah

[21] Appl. No.: 08/748,889

[22] Filed: Nov. 14, 1996

[51] Int. Cl.$^6$ .................................................... G06F 11/00
[52] U.S. Cl. .......................................... 395/187.01; 707/9
[58] Field of Search ........................... 395/186, 187.01, 395/188.01, 701, 704, 601, 609, 610, 677; 380/3, 4, 25; 707/9, 10

[56] References Cited

U.S. PATENT DOCUMENTS

| | | | |
|---|---|---|---|
| 5,032,979 | 7/1991 | Hecht et al. | 395/187.01 |
| 5,276,901 | 1/1994 | Howell et al. | 395/800 |
| 5,321,841 | 6/1994 | East et al. | 395/677 |
| 5,481,721 | 1/1996 | Serlet et al. | 395/700 |
| 5,511,197 | 4/1996 | Hill et al. | 395/700 |
| 5,586,260 | 12/1996 | Hu | 395/200.2 |
| 5,594,921 | 1/1997 | Pettus | 395/831 |
| 5,608,903 | 3/1997 | Prasad et al. | 395/187.01 |
| 5,613,148 | 3/1997 | Bezviner et la. | 395/800 |
| 5,623,601 | 4/1997 | Vu | 395/187.01 |
| 5,642,511 | 6/1997 | Chow et al. | 395/701 |
| 5,677,851 | 10/1997 | Kingdon et al. | 395/187.01 |

OTHER PUBLICATIONS

Neumann et al., "Proxy Based Authorization and Accounting for Distributed Systems", IEEE, pp. 283–291, 1993.

Shapiro, "A Binding Protocol for Distributed Shared Objects", Distributed Computig Systems, Int'l Conf., IEEE, pp. 134–141, 1994.

Dave et al., "Proxies, Application Interfaces, and Distributed Systems", Object Orientation in Oerating Systems, Int'l Workshop, IEEE, pp. 212–220, 1992.

Russo et al., "Distributed Objhect Interoperability Via a Nteowrk Type System", Object Orientation in Operating Systems, Int'l Workshop, IEEE, pp. 319–327, 1992.

Trostle et al., "A Flexible Distributed Authroization Protocol", Network and Distributed System Security Symposium, IEEE, pp. 43–52, 1996.

Schmidt et al., "Using Shared Memory for Read Mostly RPC Services", System Sciences, Annual Int'l Conf., IEEE, pp. 141–149, 1996.

Novell's Guide to NetWare 4.1 Networks, table of contents and Chapters 12 and 13, Hughes and Thomas,ISBN: 1–56884–736–X, 1996.

*Primary Examiner*—Joseph E. Palys
*Attorney, Agent, or Firm*—Dinsmore & Shohl LLP

[57] ABSTRACT

A method for a source to obtain the rights of a target object is disclosed. The source first obtains the rights of a source object, which rights include authorization to access a target object and to modify authentication data of the target object. Next, the source object generates new authentication data. After accessing the target object using the rights of the source object, the source modifies the authentication data of the target object to include the new authentication data. Using the new authentication data, the source obtains the rights of the target object, whereby the source becomes a proxy for the target object. As a proxy, the source uses the rights of the target object. Alternative processes for proxy authentication, as well as apparatus for proxy authentication, are also disclosed.

38 Claims, 5 Drawing Sheets

METHOD AND APPARATUS FOR PROXY AUTHENTICATION

TECHNICAL FIELD

The present invention relates generally to authentication in computer systems, and will be specifically disclosed in connection with authentication in a distributed directory.

BACKGROUND OF THE INVENTION

Technological advances in microelectronics, digital computers, and software have resulted in a proliferation of computer networks. In such networks, computers telecommunicate between each other and share information, applications and/or services. One type of computer network employs a client/server architecture, wherein the portions of network applications that interact with human users are typically separated from the portions of network applications that process requests and information. Often, the portions of an application that interact with users or access network resources are called client applications or client software, and the portions of an application that process requests and information are called server applications or server software.

One mechanism to maintain and access information across a network of computers is a distributed directory, such as Novell Directory Services, which is based on the X.500 network services protocol developed and published by the CCIT and Open Systems Interconnection Consortium. Usually, a distributed directory spans and is shared by multiple networking servers. Information on the distributed directory can be created, read, modified, and shared by network clients who have applicable access rights across the plurality of servers.

The distributed directory contains a collection of objects, sometimes referred to as identities, with associated attributes or properties. For example, an object named "Computer" may have associated properties such as "Owner", "Operator", "Status", etc. Each associated attribute has a value. For example, the value for the property "Owner" might be "George.ACME". Often, objects in the distributed directory and their names represent things that humans relate to when dealing with computers. For instance, some typical objects might represent users, printers, print queues, files, resources, computers, and the like. In addition, objects can represent non-computer related things such as countries, companies, organizations, departments, buildings, and the like. Furthermore, objects can be organizational in nature to group other objects together. As one with ordinary skill in the art will readily appreciate, objects can represent virtually anything, whether imaginary or real, and are not limited to the context of a distributed directory.

Typically, the objects within a distributed directory are viewed by a user in a hierarchial structure, generally in the form of a tree, where the branches and leaves represent objects. The distributed directory can additionally be organized in partitions, with each partition comprising a plurality of objects organized as a subtree. Multiple replicas of the partitions are stored across the network, wherein each insular server holds a unique set of partitions and therefore a unique set of objects within that insular machine. Throughout the network, however, the overall hierarchy of the distributed directory is preserved.

Access to network resources and objects can be regulated to preserve security. This is particularly desirable as networks become larger and hold more important information. Three examples of network security include physical security, login security, and directory security. Each of these examples of security regulate access to a network and its resources, and can be used independently or in conjunction with one another, or with other forms of security. As the name implies, physical security refers to limiting physical access to a given network resource. For instance, servers in a client/server network are often maintained in a locked room with limited access. As a further example of physical security, a file server console or a workstation can be locked requiring a password or key to access or utilize the server or workstation, respectively.

Login security can vary greatly from one computer system to the next. One form of login security comprises a login phase and an authentication phase. The login phase typically involves prompting a source (such as a user, a program, a resource, etc.) which is attempting to enter the system for a name and a password. After successfully proving knowledge of the password, the source receives an encrypted private key from a server. Next, a credential is used in conjunction with the private key to generate a signature. In the authentication phase, the public key of the server is read by the source. The signature and credential generated during the login phase is used to create a proof which is sent to the server. The proof is verified by the server through a computation using the source's public key stored in the source's object. If the proof is correct, then authentication is successful and the source is allowed access to the system. After successfully completing the authentication phase, the source has "logged in"the system and is represented by an object identity on the distributed directory. The login phase is typically performed only once. However, if, for example, a connection needs to be made to other network servers, the authentication phase can be repeated through a process known as background authentication. This involves subsequent verification by servers using the proof and the public key without additional intervention by the source.

Directory security is usually used in conjunction with login security, where directory security is not used unless login security has been first verified. While directory security can vary greatly, it generally comprises two parts: file system security and object security. File system security provides access control to files and directories, and basically involves assigning trustee rights and file/directory attributes. Trustee rights assignments can be granted to any object in the distributed directory including container objects, user objects, group objects, and organization roles. Examples of such rights include access control, supervisor, read, write, create, erase, modify, and file scan. In contrast, file/directory attributes control what actions can or cannot be taken on a file or directory. For example, certain files could be flagged as "read only" and "shareable" to prevent any unintentional or intentional deletions of such files or directories.

On the other hand, object security provides access control to directory objects and associated operations. Object security generally includes object rights, property rights, and access control lists ("ACL's"). Object rights are granted to a particular object to access or manage another object. Examples of such rights include supervisor, browse, create, delete, and rename. In contrast, property rights enable a trustee to view or change the values of a particular object's properties. A trustee could have rights to certain properties or to all properties of a particular object. For example, the supervisor property right over an object grants supervisor privileges for all properties in that object. All other rights assignments made at the object level, however, are not affected by the property rights. In fact, supervisor rights at the property level do not grant supervisor rights at the object level. Only the reverse is true. The ACL is a special property of every object, which contains trustee assignments for an object and its properties. Typically, an ACL is a tabulated property containing three entries: the trustee ID, the type of access (i.e. object or property), and the actual rights assignment. A user object, for example, with the write right to the ACL of another user object has what is known as "managed rights" over the user object. This means that an object with the write right of an object ACL can make any rights assignments to that object.

A principle known as "least privilege" teaches that a source should have no more rights than is needed. By following this principle, accidental or malicious injury to a secured system can be reduced. However, in certain circumstances it is desirable for a source to have extra rights or to borrow the rights of an object, thereby acting as a proxy of that object. However, existing computer systems and distributed directories do not provide for a source to act as a proxy for such objects.

SUMMARY OF THE INVENTION

Accordingly, an objective of this invention is to provide a method and apparatus for proxy authentication. Additional objectives, advantages, and novel features of the invention will be set forth in part in the description that follows and in part will become apparent to those skilled in the art upon examining or practicing the invention. The objects and advantages of the invention may be realized and obtained by means of the instrumentalities and combinations particularly pointed out in the appended claims.

In one embodiment of the invention, a source obtains the rights of a source object. Preferably, the source is secured. The rights of the source object include authorization to access a target object and to modify authentication data of the target object. The target object has rights to access one or more objects. Preferably, the rights of the source and target objects are enforced by directory security. Next, the source generates new authentication data. Then, the source accesses the target object using the rights of the source object. The source proceeds to modify, at least partially due to the source having obtained the rights of the source object, the authentication data of the target object to include the new authentication data. Using the new authentication data, the source obtains the rights of the target object to access the one or more objects, whereby source becomes a proxy for the target object. As a proxy, the source uses the rights of the target object to access the one or more objects.

In another embodiment of the invention, a plurality of computers access a plurality of objects in a distributed directory. A target object in the distributed directory has authentication data and rights to access one or more of the plurality of objects. A source object has rights to access the target object and to modify the authentication data of the target object, and also has authentication data capable of being obtained by a source. The computer system further comprises a generation mechanism operative to generate new authentication data for replacement of the authentication data of the target object. Also, the computer system comprises a replacement mechanism operative to replace the authentication data of the target object with the new authentication data, which enables the source to obtain the rights of the target object.

In still another embodiment of the invention, a source obtains the rights of a source object. Next, it is determined if the source object has proxy rights to a target object. For instance, such a determination can be made by checking whether the source object has rights to access or modify the authentication data of the target object, or alternatively by checking whether the source object was assigned with proxy rights to the target object. The target object has rights to access one or more objects. If the source object has proxy rights, the source object obtains the rights of the target object. The source object then uses the rights of the target object to access the one or more objects. Optionally, one or more of the events that transpire while the source object is the using the rights of the target object is stored.

Still other aspects of the present invention will become apparent to those skilled in the art from the following description of a preferred embodiment, which is simply by way of illustration one of the best modes contemplated for carrying out the invention. As will be realized, the invention is capable of other different and obvious aspects all without departing from the invention. Accordingly, the drawings and descriptions are illustrative in nature and not restrictive.

BRIEF DESCRIPTION OF THE DRAWINGS

The accompanying drawings, incorporated in and forming part of the specification, illustrate several aspects of the present invention and together with their descriptions serve to explain the principles of the invention. In the drawings.

Reference will now be made in detail to the present preferred embodiment of the invention, an example of which is illustrated in the accompanying drawings, wherein like numerals indicate the same elements throughout the views.

DETAILED DESCRIPTION

Figure 1:
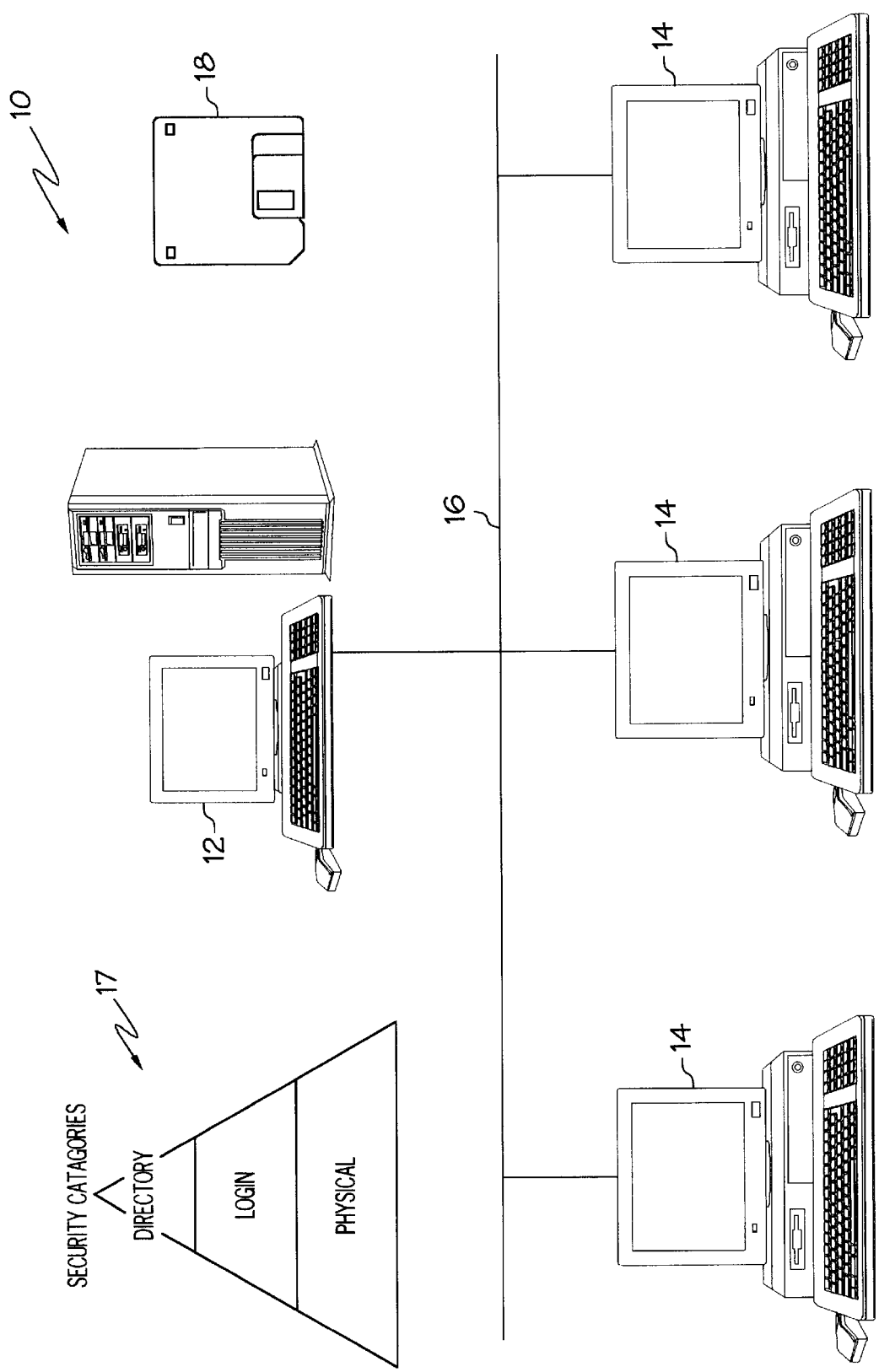
FIG. 1 depicts a schematic of a client/server network.

FIG. 1 illustrates a sample client/server network 10. As one with ordinary skill in the art will readily appreciate, a client/server network is only one type of network, and a variety of other configurations, such as peer-to-peer connections, are also considered computer networks. The server 12 is interconnected to a plurality of clients 14 using a connection 16 such as a token ring, ethernet, telephone modem connection, or the like. The security model 17 illustrates the various security categories used in the network 10, including physical, login and directory security. A computer readable medium 18, shown here as a floppy diskette, holds information readable by a computer, such as programs, data, files, etc. Other examples of computer readable medium include hard disk drives, compact discs, random access memory ("RAM"), read only memory ("ROM"), and the like.

Figure 2:
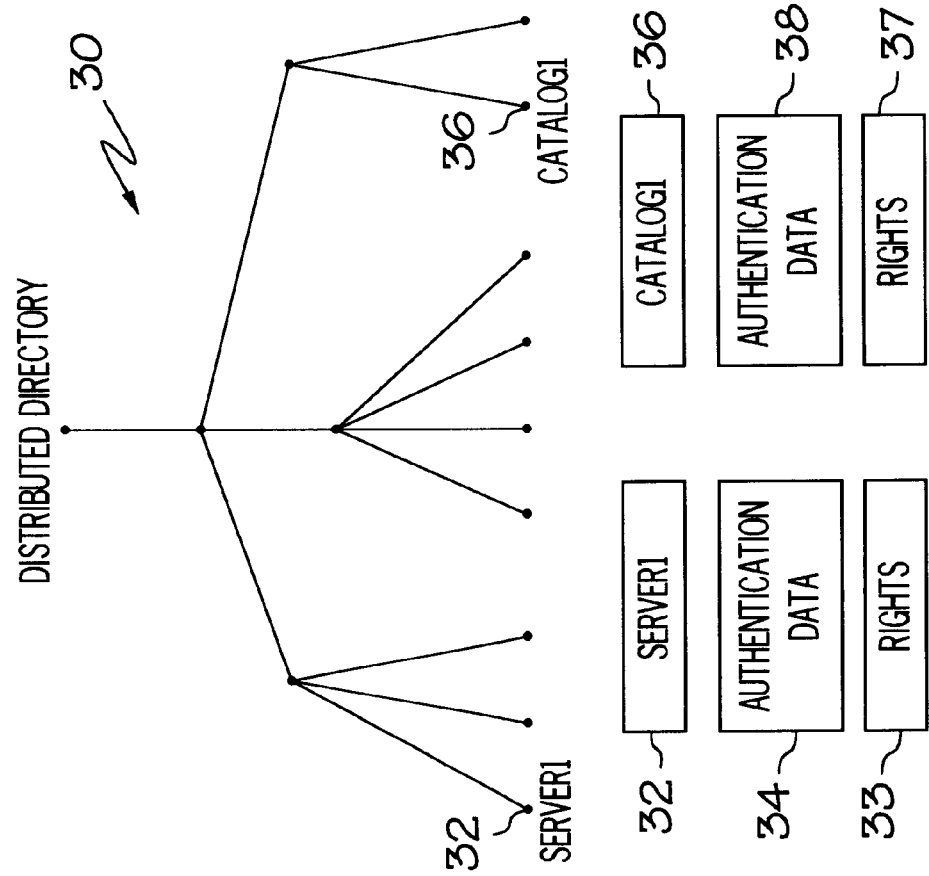
FIG. 2 illustrates a computer with a source, and a distributed directory with a source object and a target object.
Figure 2:
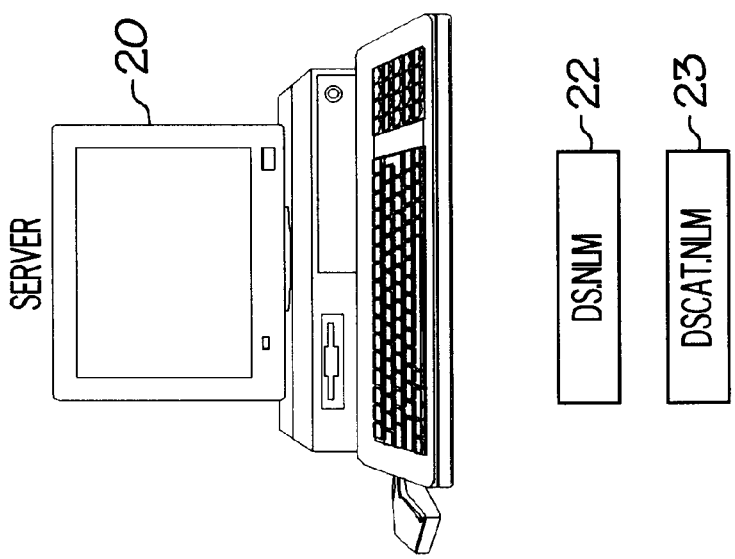

FIG. 2 depicts a computer 20 on a network, and more specifically, a server in a client/server network. The distributed directory 30 is shared by a plurality of computers over the network, and contains a plurality of objects organized in hierarchial structure, shown here as a tree, where the branches and leaves represent objects. A source object 32, called Server1, represents the computer 20 and one or more of the programs loaded on the computer 20. For the purposes of the specification and claims, a "program" is a process or task capable of being run or executed on a processor. Examples of programs include executable files, NetWare loadable modules ("NLM"), dynamic link libraries ("DLL"), batch files, threads, and the like. One such program represented by the source object 32 is by the first program 22, called DS.NLM, which is running on the computer 20 and supporting the distributed directory 30. The source 23 is a second program on the computer 20 entitled DSCAT.NLM. Among its various functions, the source 23 is designed to dredge or otherwise traverse the distributed directory 30 and extract object names, attribute syntaxes, and values distributed across the directory 30, and to store this information in a static database. In this database, searches for information may be performed rapidly without having to perform a potentially time consuming search over the entire distributed directory 30.

Authentication data 34 is associated with the source object 32. For the purposes of the specification and claims, "authentication data" refers to information used to verify authenticity. Examples of authentication data include a proof, password, credential, public key, private key, and the like. The authentication data 34 can be used during the login phase or authentication phase, or both, of login security to verify the authenticity of the source 23 or the source object 32. Subsequent verification can be achieved using background authentication.

The source object 32 also has rights 33 within the distributed directory 30. Directory security regulates these rights 33, which can include authorization to access and modify certain objects within the distributed directory 30. One such object is the target object 36, entitled Catalog1, which represents the catalog or database holding information on the distributed directory 30. The target object 36 typically has extensive rights 37 to access many objects, if not all objects, throughout the distributed directory 30. Like the source object 32, the target object 36 has its own authentication data 38, and its rights 37 can be controlled by directory security. When the source 23 is executed on the computer 20, it will log into the distributed directory 30 and can be represented by the source object 32. The nature of the source 23 is that it needs to access a broad range of objects within the distributed directory 30 to effectively dredge, however, the source object 32 will most likely lack the necessary breadth of rights.

Figure 3:
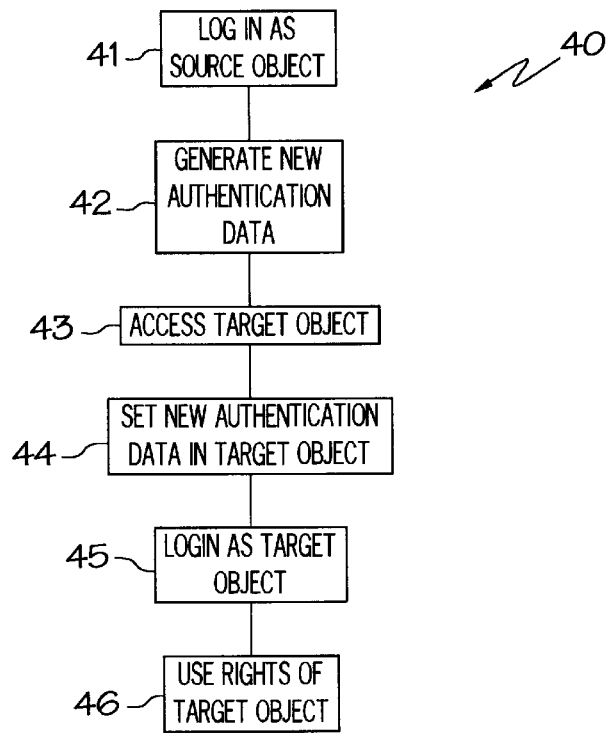
FIG. 3 shows a flowchart of a process embodying the invention.

The flow chart shown in FIG. 3 illustrates a process 40 for allowing the source 23 to obtain the rights 37 of the target object 36 to access one or more objects in the distributed directory 30, and thereby facilitate the source 23 to dredge the distributed directory 30. In step 41, the source 23 logs into the distributed directory 30 as the source object 32. Typically, the source 23 must be verified through some security mechanism before this step can be completed. One suitable form of security is login security. In one embodiment, the source 23 accesses the public/private key pair of the source object 32 through the first program 22, and uses the authentication phase of login security to log into the distributed directory 30. The ability to obtain the key pair is due to the source 23 running on the same computer 20 as the first program 22. Because the source 23 can log into the distributed directory 30 by running on the same computer 20 as the first program 22, it is preferred that the computer 20 be physically secured. Having logged in as the source object 32, the source 23 has obtained the rights 33 of the source object 32, including the authorization to access the target object 36 and to modify the authentication data 38 of the target object 36.

The next step 42 involves the source 23 generating new authentication data. Preferably, this step is achieved by generating a random password and calculating a new private/public key pair, however, a variety of other suitable means could be used. For instance, step 42 can be achieved by retrieving data from a table, using a time stamp, calculating a password, etc. Step 43 involves the source 23 accessing the target object 36 by using the rights 33 of the source object 32. In step 44, the source 23 modifies the authentication data 38 of the target object 36 to include the new authentication data. Ideally, the new authentication data is cryptographically transmitted to the target object 36. Preferably, the new authentication data replaces the old authentication data 38. This step 44 can be achieved at least partially due to the source 23 having obtained the rights 33 of the source object 32. Upon the successful completion of step 44, the source 23 is enabled to obtain the rights 37 of the target object 36.

At step 45, the source 23 logs into the distributed directory 30 using the new authentication data, thereby obtaining the rights 37 of the target object 36, including the authorization to access the one or more objects. By logging in as the target object 36, the source 23 becomes a proxy for the target object 36, and as a proxy the source 23 can use the rights 37 of the target object 36, as shown in step 46, to perform its dredging operation.

For the configuration illustrated in FIG. 2, the process 40 is preferably implemented using a series of Application Program Interfaces ("API's") called in the program source code of the source 23. Examples of suitable API's for use in Novell Distributed Services are as follows:

AttachToFileServer: This function attaches (i.e. establishes a communication) the source 23 to a file server in a client/server network. The parameters include serverName and newConnID. The parameter serverName points to the name of the server to be connected, which name can be retrieved using an API such as GetFileServerName. The parameter newConnID points to the new connection handle, if the attachment was successful. Before attaching to the specified server, this function tries to get the server's net address from the default server's Bindery. The function returns success or error codes.

NWDSGetServerDN: This function returns the server's distinguished name in the distributed directory 30. The parameters include context, conn, and serverDN. The parameter context specifies the directory context for the request. The parameter conn specifies the connection to the server to be queried and is the connection handle to the server. The parameter serverDN points to the distinguished name of the server. The caller must allocate space to hold the distinguished name of the server and set serverDN to point to it. The size of the allocated memory is (MAX_DN_CHARS+1)*sizeof (character size) where character size is 1 for single-byte characters and 2 for double-byte characters (Unicode is double byte). One character is used for NULL termination. The function returns success or error codes.

NWDSLoginAsServer: This function retrieves the authentication data 34 of the source object 32 and uses this data in the authentication phase of login security. The only parameter is context, which specifies the directory context for the request. This function is only available to programs running on the same computer as a program supporting the distributed directory, such as the first program 22. The function returns success or error codes.

NDSCGenerateRandomPassword: This function is a generation mechanism that generates a random alpha-numeric password. The only parameter is objectPassword, which points to the generated password. Alternatively, this function could be substituted with code to generate the random password. The function does not return a value.

NWDSGenerateObjectKeyPair: This function is a replacement mechanism that both creates or changes public/private key pair for a specified object. The parameters include context, objectName, objectPassword, and optionsFlag. The parameter context specifies the directory context for the request. The parameter objectName points to the name of the object to update. The parameter objectpassword points to the object password. If no password is desired, objectpassword should point a zero length string (""). If an application has a local copy of any password value, the value should be erased as soon as possible to prevent compromising the security of the password. The parameter optionsFlag is a reserved value, which is pass in zero. The function returns success or error codes.

NWDSLogin: This function performs all authentication operations needed to establish a connection to the network and the network's authentication service. Until an authenticated connection is established, the client can access only Directory information classified as public. The function caches authentication information locally to be used by other functions and in background authentication to additional services. The parameters of this function include context, optionsFlag, objectName, password, and validityPeriod. The parameter context specifies the directory context for the request. The parameter optionsFlag is reserved value, which is passed in zero. The parameter objectName points to the name of the object logging into the network. The parameter password points to the client's current password in clear text. If there is no password for the client, its value should point to a zero length string (""). If an application has a local copy of any password value, the value should be erased as soon as possible to prevent compromising the security of the password. The parameter validityPeriod specifies the time interval in seconds during which the client's authentication remains valid. If the value is zero, the authentication service supplies a default value. Also, if this value exceeds the default value supplied by the authentication service, the default value is applied. The validation periods begins by calling this function. The minimum recommended period is 60 seconds. Shorter times may cause the authenticator to expire before it can be used. If the authenticator expires before the client logs out, the log out process is not completed. The function returns success or error codes.

Additional or alternative API's could be used to achieve the process 40. Also, the precise use of these API's will depend upon whether the source is a program, user, client, etc. For the process 40 depicted in FIG. 3, the following source code illustrates one way of using the above-listed API's:

```
/*************************************************************/
/*
    Name:           NDSCLoginToCatalogObject
    Description:    Called by NLM to create proxy object with that object's rights to the
                    directory.
    Parameters:     context      -directory context used in calls to the directory.
                    dnCatalog    -distinguished name of catalog object.
*/
/*************************************************************/
int NDSCLoginToCatalogObject(NWDSContextHandle context, char *dnCatalog)
{
    NWDSCCODE ccode;
    int cntRetries = 3;
    char dnServer[MAX_DN_BYTES];
    FILE_SERV_INFO serverInfo;
    WORD connID;
    char serverName[MAX_NAME_SIZE+1];
    char password[MAX_PASSWORD_LEN+1];
    /* Attach to file server */
    GetFileServerName( 0, serverName );
    ccode = AttachToFileServer( serverName, &connID );
    /* Get the serve's DN */
    ccode = NWDSGetServerDN( context, GetCurrentConnection( ), dnServer );
    if (ccode)
    {
        NWprintf( NDSC_GETSERVERDN_FAILED, ccode );
        return ccode;
    }
    /* Log in as server to get access to server object */
    ccode = NWDSLoginAsServer( context );
    if (ccode)
    }
        NWprintf( NDSC_LOGIN_FAILED, dnServer );
        return ccode;
    }
    /* Generate random password */
    NDSCGenerateRandomPassword( password );
    /* Set new password */
    ccode = NWDSGenerateObjectKeyPair( context, dnCatalog, password, 0 );
    if (ccode)
        NWprintf( NDSC_GENKEYPAIR_FAILED, ccode, dnCatalog );
    if (!ccode)
    {
        /* Now log in with that password - - retry for one half minute
                to allow for replication */
        while (cntRetries - - > 0)
```

```
        {
            ccode = NWDSLogin( context, 0, dnCatalog, password, 0);
            if (!ccode)
                break;
            delay( 100000 );
        }
        if (ccode)
            printf(NDSC_LOGIN_FAILED, ccode, dnCatalog );
    }
    return ccode;
}   /** end NDSCLoginToCatalogObject**/
```

Figure 4:
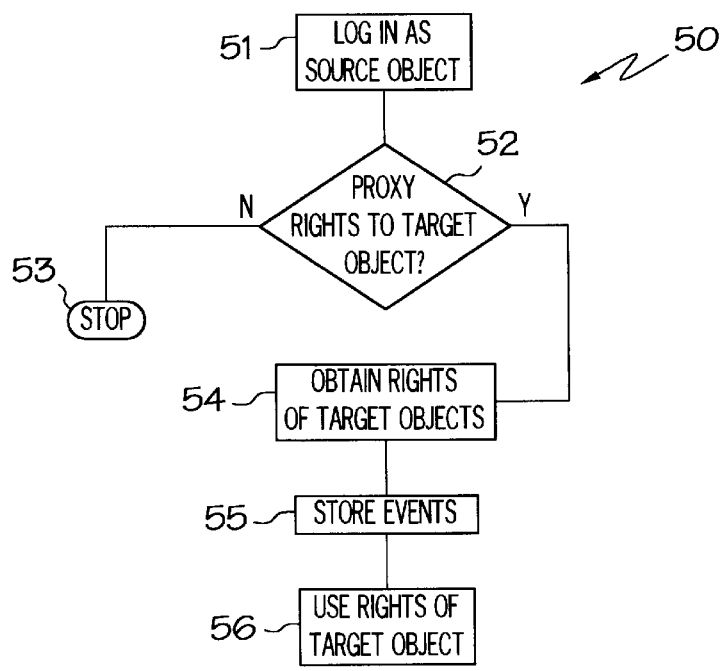
FIG. 4 shows a flowchart of an alternative embodiment of the invention.

FIG. 4 illustrates an alternative process 50 for the source 23 to become a proxy for the target object 36. In step 51, the source 23 logs in as the source object 32, and thereby obtains the rights 33 of the source object 32. Like the process 40, this step 51 can be achieved in a variety of ways, and preferably uses at least a portion of login security. At step 52, a determination is made whether the source object 32 has sufficient rights 33 to become a proxy for the target object 36. This can be achieved by determining whether the rights 33 include authorization to access and/or modify the authentication data 38 of the target object 36. If the source object 32 has such rights 33, the determination block 52 is positive. Alternatively, the determination step 52 can involve checking whether the source object 32 has been assigned a "proxy" right to the target object 36. Such a right can enable the source object 32 to obtain one or more of the rights 37 of the target object 36. Preferably, this proxy right is enforced using directory security and will be listed in the ACL of the target object 36. If the proxy right has been assigned, the determination block 52 is positive. If, however, the determination block 52 is negative, the process 50 proceeds to step 53 and is terminated.

If the decision block 52 is positive, the process 50 proceeds to step 54 where the source object 32 obtains the rights 37 of the target object 36. One way to achieve this step 54 is to modify the source object's record in the connection table to reflect the rights 37 of the target object 36. However, doing so does not necessarily remove the source object's rights 33 in the connection table. Additionally or alternatively, the source object 32 can obtain the authentication data 38 of the target object 36, preferably by changing the state of the source object 32 to the target object 36. In step 54, if an auditing of events is desired, one or more of the events that transpire while the source object 32 is accessing the one or more objects is stored. Preferably, only significant events, such as modifications, additions, deletions and the like, are stored. Also, it is preferred that a record be maintained that such events were performed by the source object 32 acting as a proxy for the target object 36. Such an audit record can be used to audit the activity of the source object 32, and avoid any potential misconceptions that the target object 36 was responsible for such events. At step 56, the source object 32 uses the rights 37 of the target object 36 to access one or more objects in the distributed directory 30. One difference between the process 50 and the process 40 is that the authentication data 38 of the target object 36 remains unchanged. This difference could be beneficial or detrimental depending upon the application. A further difference is that an audit of events from a proxy resulting from process 50 can identify the proxy as being responsible.

Figure 5:
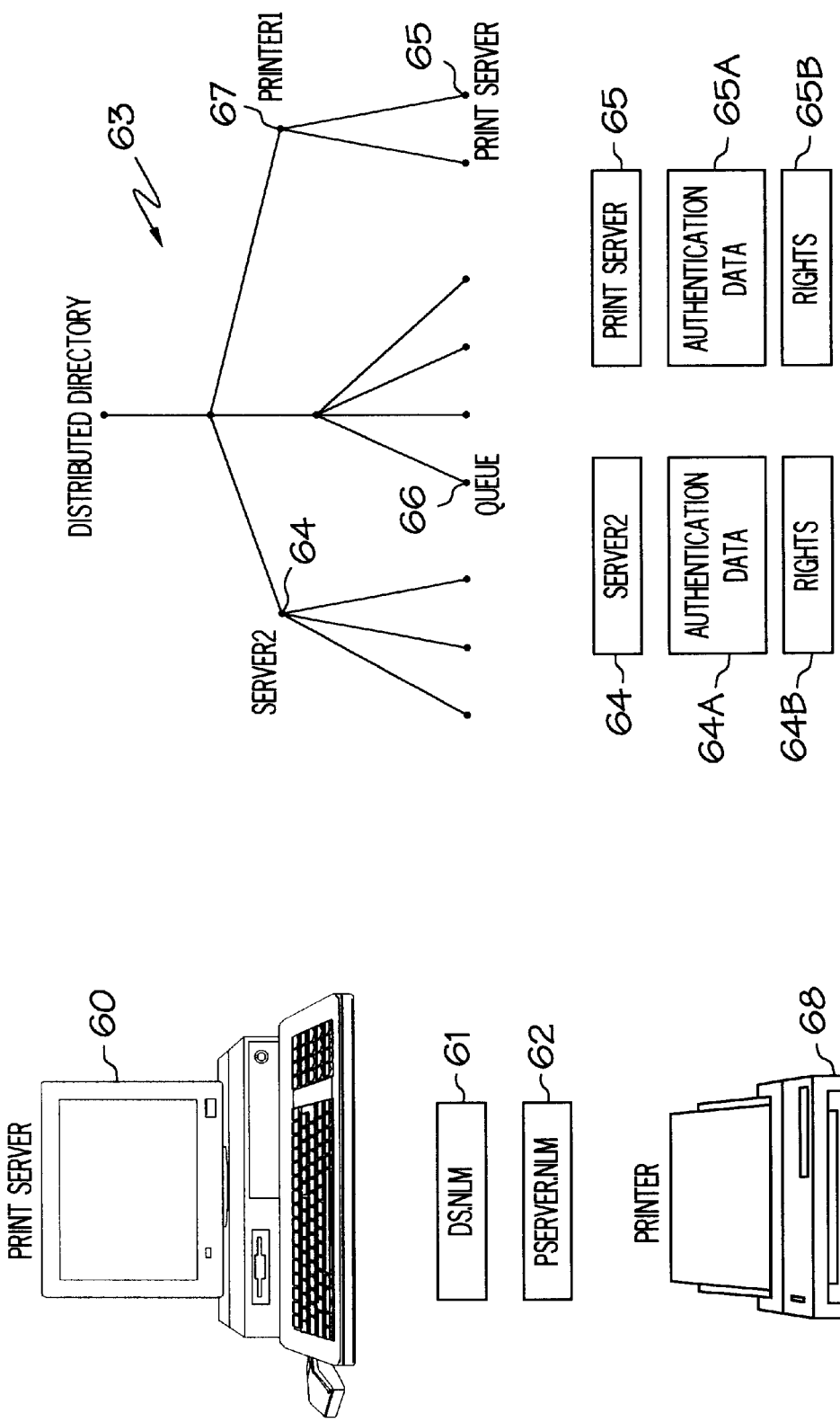
FIG. 5 illustrates an embodiment of the invention involving a print server, a printer, and a distributed directory.

FIG. 5 depicts an embodiment of the invention in the context of a print server 60. Loaded on the print server 60 is a first program 61, entitled DS.NLM, which supports the distributed directory 63. A source 62, entitled PSERVER.NLM, is a second program loaded on the print server 60. Preferably, the print server 60 is physically secured. The distributed directory 63 is accessed by a plurality of computers on a network, including the print server 60. The source object 64, entitled Server2, is an object in the distributed directory 63 representing one or more programs loaded on the print server 60. The source object 64 has rights 64B enforced by directory security to access and modify certain objects in the distributed directory 62. One such object is the target object 65, entitled PrintServer, which has access rights 65B to objects Queue 66 and Printer1 67. The Queue 66 represents a printer queue and Printer1 67 represents the physical printer 68. The source and target objects 64 and 65 have their own authentication data 64A and 65A, respectively. Using either the process 40 or process 50, the source 61 can log into the distributed directory 63 as the source object 64. After having successfully logged in, the source 62 can then take the appropriate actions to become a proxy for the target object 65, and thereby to access object Queue 66 and Printer1 67.

Figure 6:
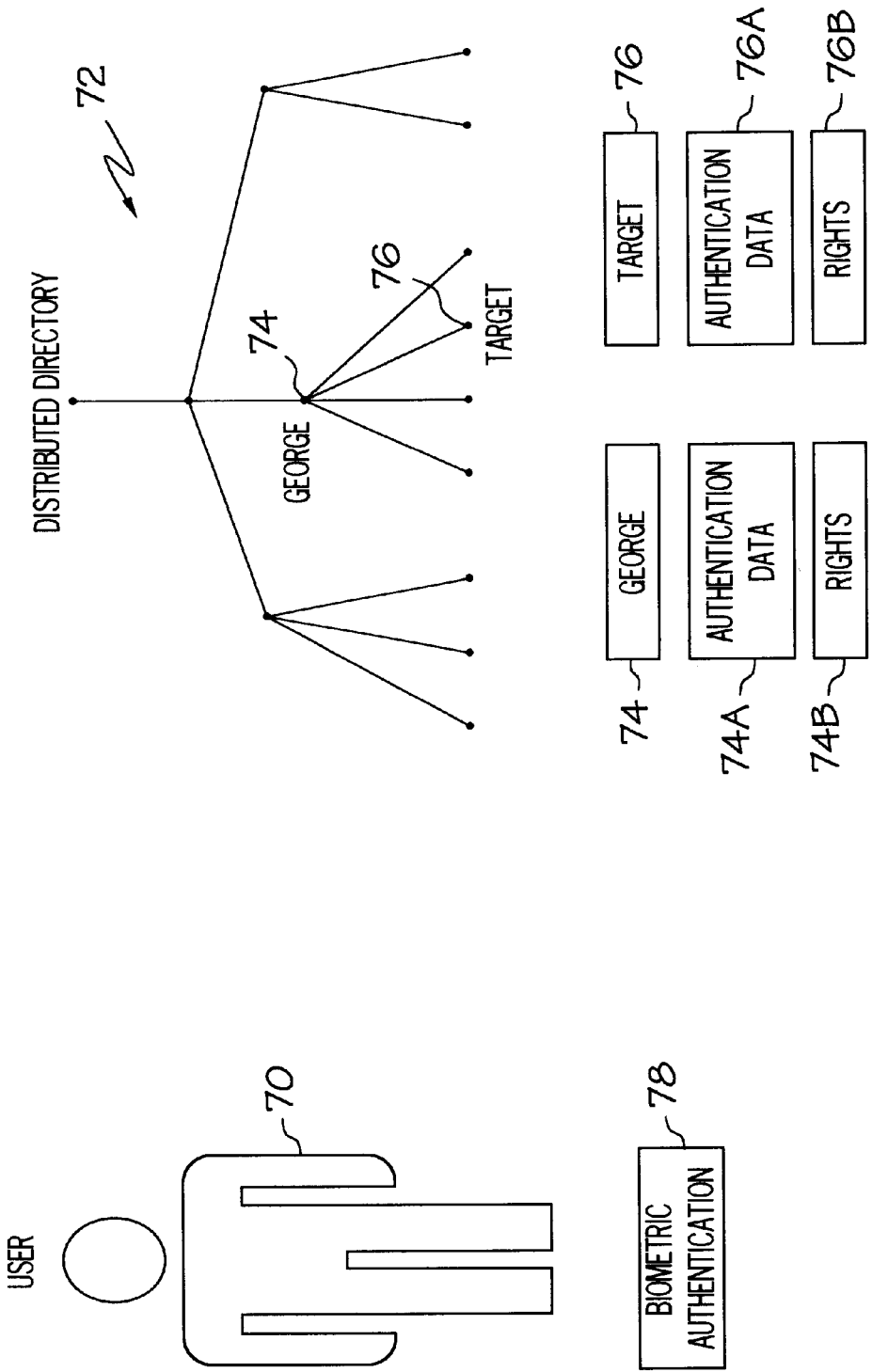
FIG. 6 illustrates a user source and a distributed directory.

FIG. 6 shows yet another configuration where the present invention can be utilized. A source 70, which is a user, can log into the distributed directory 32 using login security, and be represented by the source object 74 entitled George. Because users do not have the security benefit of physical security, unlike servers 20 and 60, it is preferred that the source 70 be secured. This can be achieved using a biometric authentication security system 78 to verify that the source 70 is not an intruder. Examples of biometric authentication include fingerprint comparison, retina scans, voice analysis, etc. The source object 74 has rights 74B, preferably enforced by directory security, to access other objects in the distributed directory 72, and has its own authentication data 74A. The target object 76 also has rights 76B, preferably enforced by directory security, to access one or more objects in the distributed directory 72, and also has its own authentication data 76A. Using either the process 40 or 50, the user 70 can obtain the rights of the target object 76 and thereby become a proxy for the target object 76.

The foregoing description of the preferred embodiment of the invention has been presented for purposes of illustration and description. It is not intended to be exhaustive nor to limit the invention to the precise form disclosed. Many alternatives, modifications, and variations will be apparent to those skilled in the art in light of the above teaching. For instance, each of the above examples used objects in the context of distributed directories, however, one with ordinary skill in the art will readily appreciate that the term "object" has meaning beyond distributed directories. Unless specifically qualified otherwise, the term "object" is not limited to distributed directories. Additionally, the invention has been illustrated in the context of networked computers, however, the invention can be used in stand alone computers and/or processors. Likewise, the invention has utility in systems other than Novell Directory Services, including, for example, Windows NT, Windows 95, OS/2, Macintosh Operating systems, Vines, etc. Accordingly, this invention is intended to embrace all such alternatives, modifications, and variations that fall within the spirit and broad scope of the impended claims.

What is claimed is:

1. A method in a computer system, comprising the steps of:
   (a) obtaining by a source the rights of a source object, the rights of the source object including authorization to access a target object and to modify authentication data of the target object, the target object having rights to access one or more objects;
   (b) generating new authentication data by the source;
   (c) accessing the target object by the source using the rights of the source object;
   (d) modifying, at least partially due to the source having obtained the rights of the source object, the authentication data of the target object to include the new authentication data;
   (e) using the new authentication data by the source to obtain the rights of the target object to access the one or more objects, whereby the source becomes a proxy for the target object; and
   (f) using by the source the rights of the target object.

2. A method as recited in claim 1, wherein the source object represents one or more programs loaded on a computer.

3. A method as recited in claim 2, wherein the computer is a server.

4. A method as recited in claim 2, wherein the source is a program loaded on the computer.

5. A method as recited in claim 4, wherein the source can obtain the rights of the source object at least partially due to the program is running on the computer.

6. A method as recited in claim 1, wherein step (a) involves the source logging in as the source object.

7. A method as recited in claim 1, wherein step (a) involves the source obtaining authentication data of the source object.

8. A method as recited in claim 1, wherein step (b) involves generating a random password.

9. A method as recited in claim 1, wherein step (d) includes the step of cryptographically transmitting the new authentication data to the target object.

10. A method as recited in claim 1, wherein step (e) involves the source logging in as the target object using the new authentication data.

11. A method as recited in claim 1, wherein the source object, target object, and one or more objects are objects in a distributed directory.

12. A method as recited in claim 11, wherein the rights of the source object and target object are at least partially enforced by directory security.

13. A method as recited in claim 11, wherein steps (a) and (e) involve at least a portion of login security.

14. A method as recited in claim 1, wherein the source is secured.

15. A computer readable medium, comprising a program operative to perform the steps of:
   (a) obtaining by a source the rights of a source object, the rights of the source object including authorization to access a target object and to modify authentication data of the target object, the target object having rights to access one or more objects;
   (b) generating new authentication data by the source;
   (c) accessing the target object by the source using the rights of the source object;
   (d) modifying, at least partially due to the source having obtained the rights of the source object, the authentication data of the target object to include the new authentication data;
   (e) using the new authentication data by the source to obtain the rights of the target object to access the one or more objects, whereby the source becomes a proxy for the target object; and
   (f) using by the source the rights of the target object.

16. A computer system, comprising:
   (a) a distributed directory having a plurality objects;
   (b) a plurality of computers accessing the distributed directory;
   (c) a target object in the distributed directory having authentication data and rights to access one or more of the plurality objects in the distributed directory;
   (d) a source object in the distributed directory having rights to access the target object and to modify the authentication data of the target object, said source object having authentication data capable of being obtained by a source;
   (e) a generation mechanism operative to generate new authentication data for replacement of the authentication data of the target object; and
   (f) a replacement mechanism operative to replace the authentication data of the target object with the new authentication data, which enables the source to obtain the rights of the target object.

17. A computer system as recited in claim 16, wherein the source object represents one or more programs loaded on a computer.

18. A computer system as recited in claim 17, wherein the computer is a server.

19. A computer system as recited in claim 17, wherein the computer is physically secured.

20. A computer system as recited in claim 16, wherein the authentication data of the target object includes a private/public key pair.

21. A computer system as recited in claim 16, wherein the replacement mechanism requires the rights of the source object to implement the replacement.

22. A computer system as recited in claim 16, wherein the plurality of computers comprises a client/server network.

23. A method in a computer system, comprising the steps of:
   (a) obtaining by a source the rights of a source distributed directory object in a distributed directory;
   (b) reading an attribute of one or more distributed directory objects to determine if the source object has proxy rights to a target distributed directory object in the distributed directory, the target object having rights to access one or more objects in the distributed directory;
   (c) obtaining by the source object the rights of the target object, if the source object has proxy rights; and
   (d) using by the source object the rights of the target object to access the one or more objects.

24. A method as recited in claim 23, further comprising the step of storing one or more events that transpire while the source object is using the rights of the target object.

25. A method as recited in claim 23, further including the step of recording that the source object is acting as a proxy for the target object.

26. A method as recited in claim 23, wherein step (c) involves changing the state of the source object to the state of the target object.

27. A method as recited in claim 26, wherein a record is maintained that the source object is a proxy for the target object.

28. A method as recited in claim 23, wherein step (a) involves at least a portion of login security.

29. A method as recited in claim 23, wherein step (b) involves at least a portion of directory security.

30. A method as recited in claim 29, wherein the target object has authentication data and step (b) involves determining whether the source object has rights to access the authentication data of the target object.

31. A method as recited in claim 29, wherein the target object has authentication data and step (b) involves determining whether the source object has rights to modify the authentication data of the target object.

32. A method as recited in claim 29, wherein step (b) involves determining whether the source object has been assigned proxy rights to the target object.

33. A method as recited in claim 23, wherein the source is physically secured.

34. A method as recited in claim 23, wherein step (c) preserves the rights of the source object.

35. A method as recited in claim 23, wherein the computer system has a connection table with a record for the source object and step (c) involves changing the record of the source object in the connection table to reflect the target object.

36. A method as recited in claim 23, further comprising the step of storing in a database information read from the one or more objects.

37. A computer readable medium, comprising a program operative to perform the steps of:
   (a) obtaining by a source the rights of a source distributed directory object in a distributed directory;
   (b) reading an attribute of one or more distributed directory objects to determine if the source object has proxy rights to a target distributed directory object, the target object in the distributed directory having rights to access one or more objects in the distributed directory;
   (c) obtaining by the source object the rights of the target object, if the source object has proxy rights; and
   (d) using by the source object the rights of the target object to access the one or more objects.

38. A method as recited in claim 24, further comprising the step of auditing the source by using the one or more stored events.

* * * * *